United States Patent
Bruck

(10) Patent No.: US 10,906,128 B2
(45) Date of Patent: Feb. 2, 2021

(54) DISCHARGE ACTUATED SOLID STATE ADDITIVE MANUFACTURING

(71) Applicant: SIEMENS ENERGY, INC., Orlando, FL (US)

(72) Inventor: Gerald J. Bruck, Pigeon Forge, TN (US)

(73) Assignee: SIEMENS ENERGY, INC., Orlando, FL (US)

(*) Notice: Subject to any disclaimer, the term of this patent is extended or adjusted under 35 U.S.C. 154(b) by 292 days.

(21) Appl. No.: 15/989,830

(22) Filed: May 25, 2018

(65) Prior Publication Data

US 2018/0272464 A1    Sep. 27, 2018

Related U.S. Application Data

(63) Continuation-in-part of application No. 15/045,293, filed on Feb. 17, 2016, now Pat. No. 10,046,413.

(51) Int. Cl.

| | |
|---|---|
| *B23K 20/24* | (2006.01) |
| *B33Y 10/00* | (2015.01) |
| *H05B 6/00* | (2006.01) |
| *B23K 20/06* | (2006.01) |
| *B22F 3/105* | (2006.01) |
| *C22C 1/04* | (2006.01) |

(52) U.S. Cl.
CPC ............ *B23K 20/24* (2013.01); *B22F 3/1055* (2013.01); *B23K 20/06* (2013.01); *B33Y 10/00* (2014.12); *H05B 6/00* (2013.01); *C22C 1/0433* (2013.01)

(58) Field of Classification Search
CPC ........ B23K 20/24; B23K 20/06; B23K 20/08; B33Y 10/00
See application file for complete search history.

(56) References Cited

U.S. PATENT DOCUMENTS

| | | | | |
|---|---|---|---|---|
| 5,474,226 A | * | 12/1995 | Joseph ................... | B23K 20/08 228/112.1 |
| 2011/0000953 A1 | * | 1/2011 | Daehn .................... | B23K 20/06 228/115 |
| 2012/0313299 A1 | * | 12/2012 | Bleicken .................. | B23K 7/00 266/48 |
| 2013/0316183 A1 | * | 11/2013 | Kulkarni, Jr. ........... | B23P 6/007 428/557 |

* cited by examiner

*Primary Examiner* — Brian W Jennison

(57) ABSTRACT

A method for forming an impact weld used in an additive manufacturing process is provided. The method includes providing a metallic material for impact welding to a substrate. The metallic material is propelled toward the substrate with a sufficient velocity to form an impact weld for welding the metallic material to the substrate. Further, the method includes traversing the substrate in a direction relative to a direction from which the metallic material is propelled and repeating the propelling so that a layer of additive material is deposited on the substrate as desired. In addition, a method for forming an impact welding used in an additive manufacturing process via discharge actuated arrangement is provided.

17 Claims, 5 Drawing Sheets

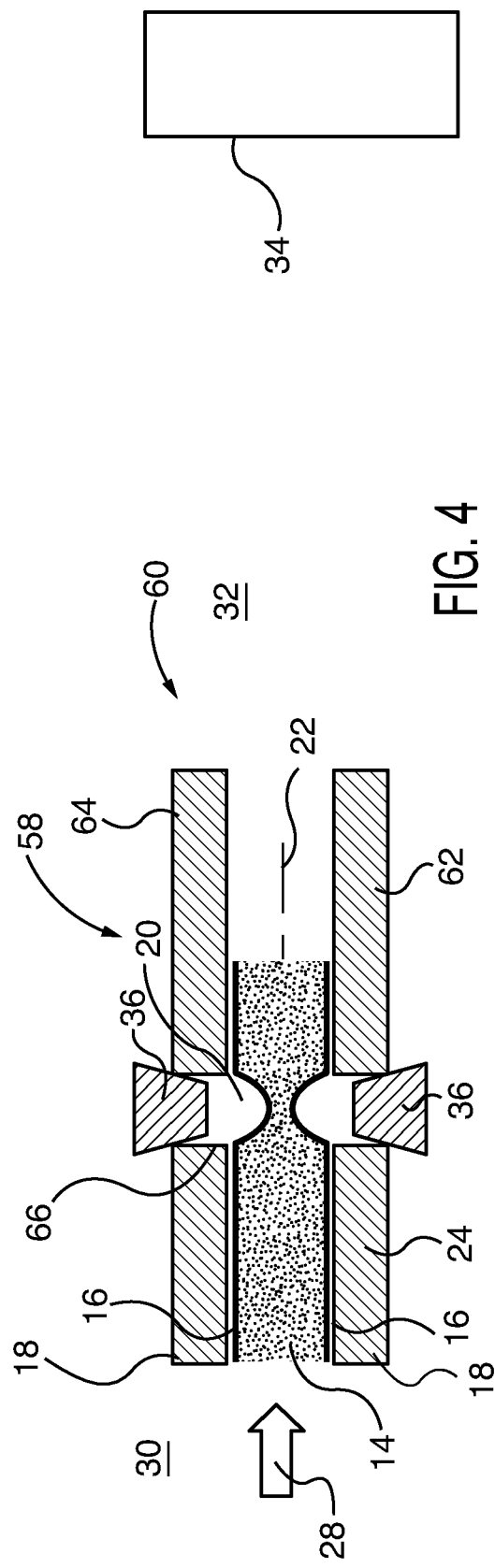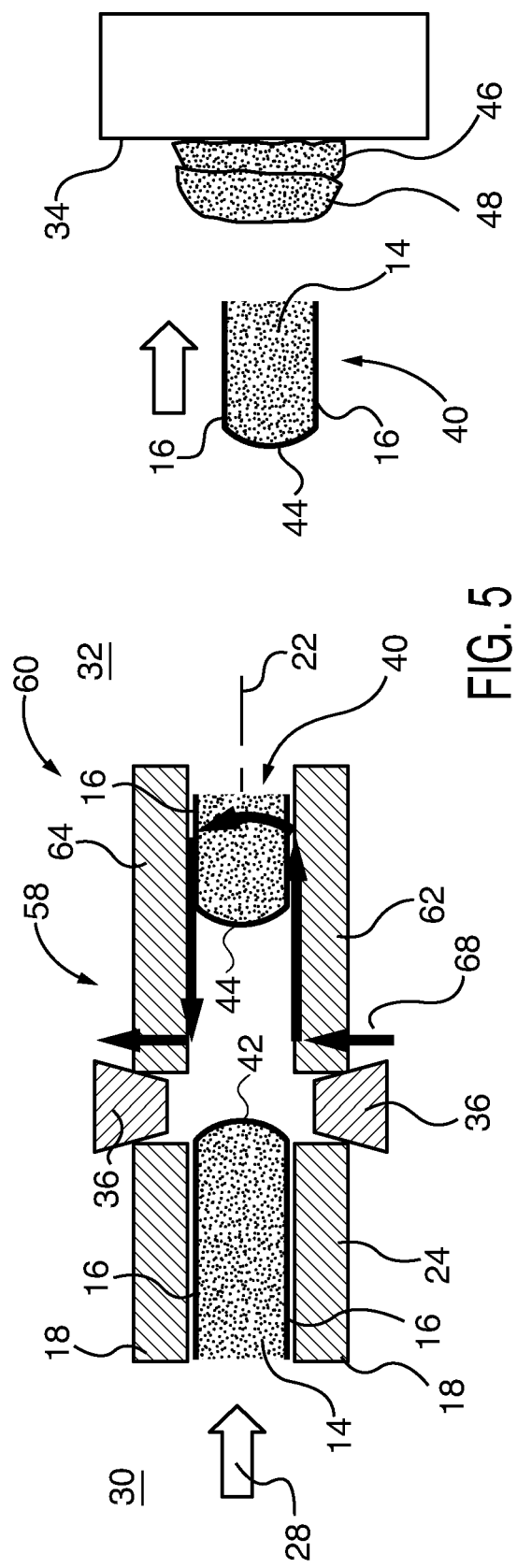
FIG. 4
FIG. 5

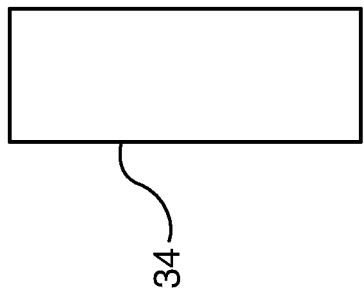
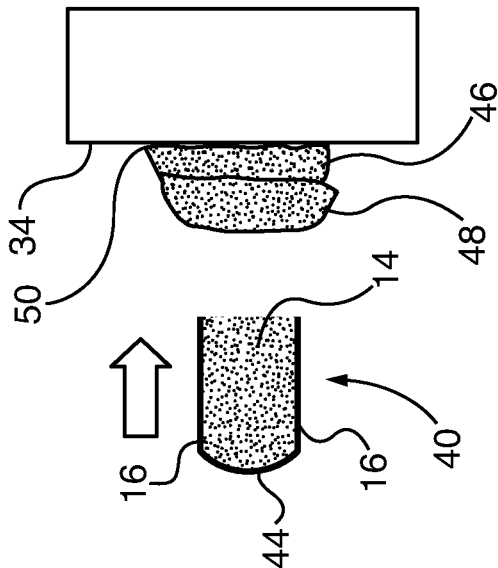
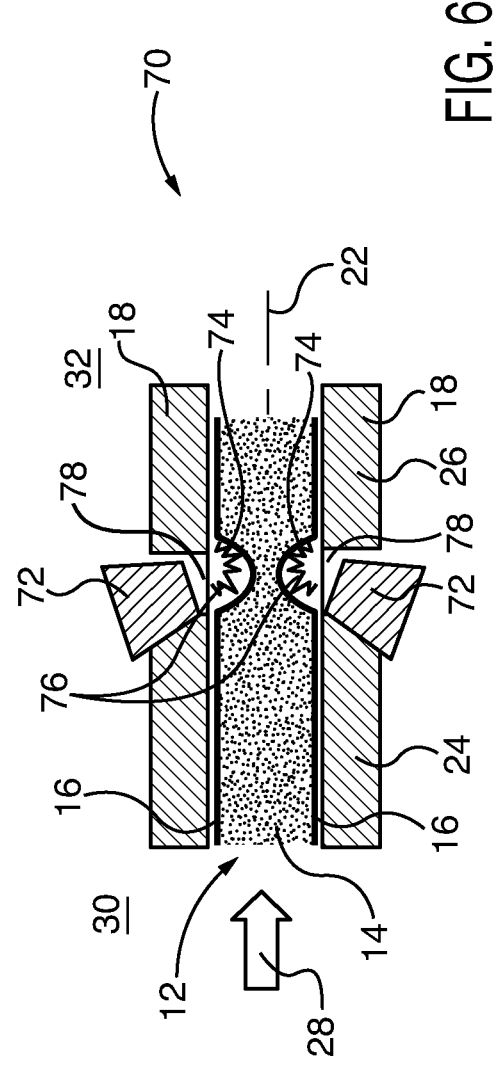
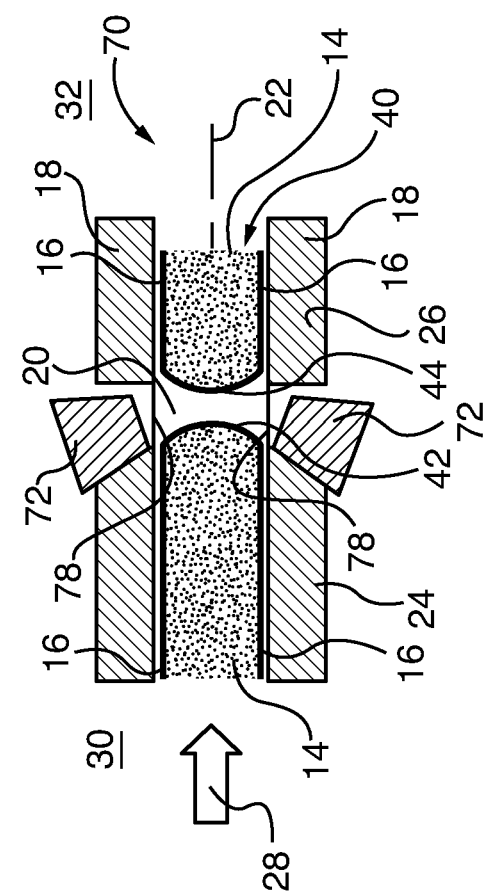
FIG. 6
FIG. 7

DISCHARGE ACTUATED SOLID STATE ADDITIVE MANUFACTURING

This application is a continuation in part of U.S. application Ser. No. 15/045,293 and claims benefit of its Feb. 17, 2016 filing date. U.S. application Ser. No. 15/045,293 is thus incorporated by reference herein in its entirety.

BACKGROUND

1. Field

The disclosure relates generally to solid state additive manufacturing, and more particularly to a method for additively manufacturing a component by impact welding.

2. Description of the Related Art

Materials that are difficult to join and especially to additively deposit, such as certain dissimilar metals (e.g. aluminium to steel) and nickel based superalloys, present welding challenges. The term "superalloy" is used herein as it is commonly used in the art, i.e., a highly corrosion and oxidation resistant alloy with excellent mechanical strength and resistance to creep at high temperatures. Superalloys typically include high nickel or cobalt content. Examples of superalloys include alloys sold under the trademarks and brand names Hastelloy, Inconel alloys (e.g. IN 738, IN 792, IN 939) Rene alloys (e.g. Rene N5, Rene 80, Rene 142) Haynes alloys, Mar M, CM 247, CM 247LC, C263, 718, X-750, ECY 768, 282, X45, PWA 1483 and CMSX (e.g. CMSX-4) single crystal alloys.

Challenges with respect to deposition during an additive manufacturing process are most frequently associated with high heat input fusion techniques such as arc welding, laser welding and others. Such challenges include precipitation of brittle phases, segregation formation and liquation cracking that may occur upon solidification of a weld. Further, strain age cracking may occur upon post weld heat treatment.

For example, gas turbine engine components, and particularly components of the engine exposed to the hot combustion gas, are subject to degradation during the operation of the engine. The original components are sometimes made and the degraded components are sometimes repaired using an additive manufacturing process. It is desirable to provide an additive manufacturing process that avoids high heat input when manufacturing or repairing a turbine component to avoid the above cited challenges.

Solid state welding provides an alternative to high heat input processes such as arc-based, plasma, laser and electron beam such that the aforementioned problems may be avoided. In solid state welding, the substrate is not melted; it produces coalescence at temperatures essentially below the melting point of the materials being joined. Of all the standard categories of Additive Manufacturing processes, as issued by the ASTM (American Society of Testing Materials), only binder jetting and sheet lamination apply to solid state additive manufacturing processes. Binder jetting involves selectively depositing a liquid binding agent to join powder particles. Layers of material are then bonded to form a component. This is necessarily followed by heat treatment, infiltration and hot isostatic pressing. A sheet lamination process including ultrasonic additive manufacturing uses sheets or ribbons of metal which are bound together using ultrasonic welding. These two categories of additive manufacturing processes are slow (of low productivity) and with regards to ultrasonic additive manufacturing, limited to very ductile materials such as aluminium alloys.

Therefore, a need exists for an improved method to perform solid state additive manufacturing.

SUMMARY

Briefly described, aspects of the present disclosure relate to method& for forming an impact welded deposit used in an additive manufacturing process that avoids high heat input when making or repairing a turbine component and a method for forming an impact welded deposit used in an additive manufacturing process via a discharge actuated arrangment.

A first aspect of a method for forming an impact weld used in an additive manufacturing process is disclosed. The aspect includes providing a metallic material for impact welding to a substrate. The metallic material is propelled toward the substrate with sufficient velocity to form an impact weld of the metallic material to the substrate. Further, the method includes traversing the substrate in a direction relative to a direction from which the metallic material is propelled and repeating the propelling so that a layer of additive material is deposited on the substrate in desired pattern and distribution.

A second aspect of a method for forming an impact weld used in an additive manufacturing process is achieved via a discharge actuated arrangement. The aspect includes providing a discharge actuated device having an opening. Metallic shot material is loaded into a magazine of the discharge actuated device. The metallic material is then discharged from the device through the opening wherein the discharged metallic particle is propelled toward a substrate of sufficient velocity to form an impact weld of the metallic shot particle to the substrate.

BRIEF DESCRIPTION OF THE DRAWINGS

FIGS. 4 and 5 depict a railgun arrangement for use in conjunction with the magnetic pulse welding arrangement wherein the railgun arrangement also accelerates the wire segment.

FIGS. 6 and 7 depict an alternate embodiment of the invention wherein a laser impact welding arrangement is used to form a wire segment that is accelerated toward a substrate to form an impact weld.

DETAILED DESCRIPTION

Figure 1:
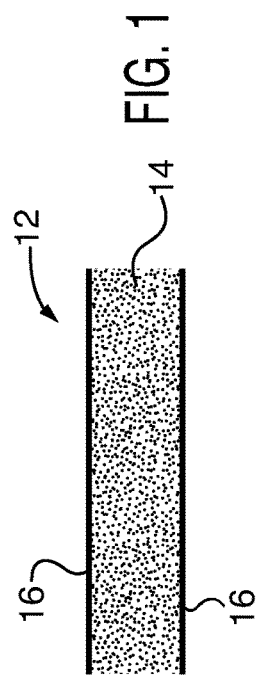
FIG. 1 depicts a cored wire that includes a powder filler metal core located within a sheath for use in an additive manufacturing process.

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

The disclosure teaches an innovative solution to achieve a highly productive and practical method of solid state additive manufacturing.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

A magnetic pulse welding arrangement for use in an additive manufacturing process will now be described. In regard to magnetic pulse welding, the disclosure of U.S. Pat. No. 3,520,049 is hereby incorporated by reference. Aspects of a magnetic pulse welding process are used to pinch off segments of a cored wire 12 that includes a powder filler metal core 14 located within a sheath 16 (see FIG. 1). For example, the powder core material 14 may be of the type suitable for repairing superalloy components. The sheath 16 may be manufactured from a nickel based material and is compatible with a desired composition of the deposited core material. Further, a surface of the sheath 16 may include a small amount of an electrically conductive material such as copper. In particular, the sheath 16 may include a sufficiently thin flash of copper or highly conductive metal or alloy that does not significantly alloy with the deposited core material. Alternatively, for example, the sheath 16 may include a thin coating of aluminum to provide electrical conductively for the sheath 16. It is noted that aluminum is used as an ingredient in many nickel based superalloys and thus would be compatible with the powder core material 14.

Figure 2:
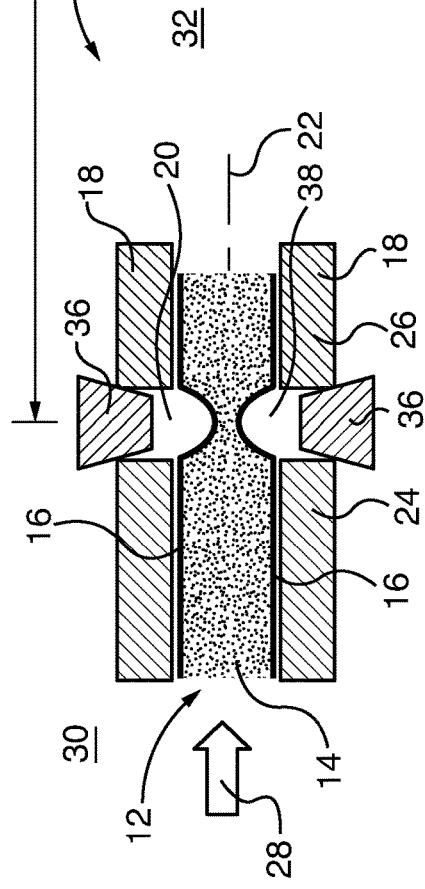
FIGS. 2 and 3 depict a magnetic pulse welding arrangement in accordance with an embodiment of the invention wherein the magnetic pulse welding arrangement forms a wire segment that is accelerated toward a substrate to form an impact weld.
Figure 3:
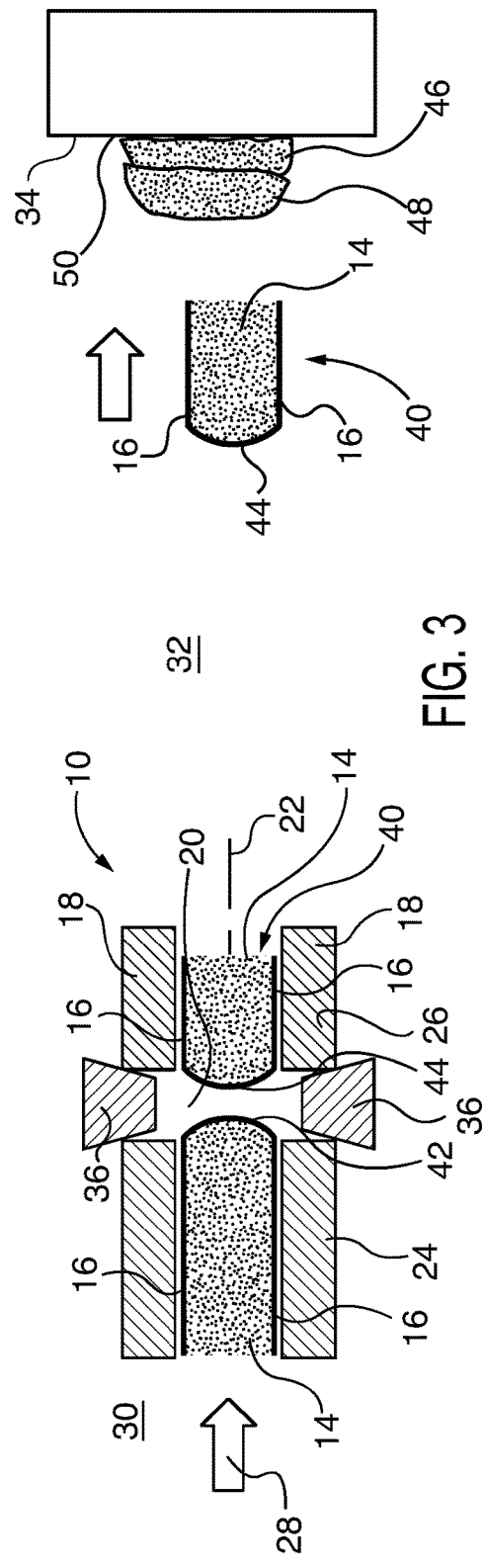

Referring to FIGS. 2 and 3, a magnetic pulse welding arrangement 10 for use in an additive manufacturing process is shown. Referring to FIG. 24, the magnetic pulse welding arrangement 10 includes a conduit 18 (shown as a cross sectional view) that receives the wire 12. The conduit 18 includes an opening(s) 20 oriented transverse to an axis 22 of the conduit 18 thereby dividing the conduit 18 into first 24 and second 26 conduit sections. The wire 12 is fed into the first conduit section 24 in a first direction (see arrow 28) from an upstream end 30 to a downstream end 32 toward a substrate 34. In particular, the wire 12 is fed past the opening 20 until a desired length of wire 12 is positioned in the second conduit section 26. The opening 20 exposes a circumferential portion 38 of the sheath 16. At least one magnetic coil 36 (shown as a cross sectional view in FIG. 2) is circumferentially positioned relative to the opening 20 such that the coil 36 is located adjacent the circumferential portion 38 of the sheath 16. Note that opening 20 in conduit 18 may not necessarily be a physical opening. Opening 20 only needs to be a location in conduit 18 such that the effect of magnetic coil 36 may pass through conduit 18 to wire 12. Magnetic fields may for example transmit through many materials such as ceramics, paper, plastic and glass.

In operation, the coil 36 is energized so as to generate an electromagnetic pulse in a circumferential direction around the sheath 16 which causes the creation of eddy currents. For example, pulse duration may be in the order of microseconds. The electromagnetic pulse interacts with the sheath 16 to cause spaced apart portions of the sheath 16 to move toward each other until the sheath 16 is ruptured so that a portion of the wire 12 in the second conduit section 26 is cut or pinched off the wire 12. This forms a wire segment 40 including a portion of sheath 16 and the powder core material 14. A downstream end 42 of the remaining wire 12 in the first conduit section 24 and an upstream end 44 of the segment 40 are subsequently closed off by the sheath 16 due to plastic deformation of the sheath 16.

Opposing Lorentz forces accelerate the segment 40 toward the substrate 34 such that the segment 40 impacts the substrate 34 at a sufficiently high velocity to cause plastic deformation at an interface between the powder core material 14 and sheath 16 and the substrate 34. For example, the velocity at impact may be approximately 100 to 500 m/sec. Referring to FIG. 3, this forms an impact weld that joins the powder core material 14 and sheath material and the substrate 34 thereby forming a first layer of core material 46. In a publication entitled "Welding Handbook", Volumes 1 and 2, published by the American Welding Society (AWS), explosion welding is defined, in part, as a solid-state process that produces a weld by high-velocity impact of the workpieces. Thus, the present invention utilizes aspects of explosion or impact welding in an additive manufacturing process. Further, little or no melting occurs except for possible minimal incipient local fusion. Additional segments 40 are then continuously pinched off from the wire 12, each propelled toward a previously formed layer of core material 46, i.e., an underlying layer, so as to incrementally form additional layers of core material for repairing a turbine component, for example. For purposes of illustration, FIG. 32B depicts first 46 and second 48 layers of core material.

The circumferential portion 38 and substrate 34 are separated by a standoff distance D (on the order of a few millimeters) to enable the segment 40 to achieve sufficient velocity and impact momentum to cause plastic deformation and bonding at the interface 50 between the core material 46 and the substrate 34. In addition, the coil 36 may be oriented so as to angle the electromagnetic pulse and, in turn, direct the Lorentz forces and thus the segment 40 in the downstream direction. Further, contaminants or oxides that may be present on the core material 46 and substrate 34 may be extruded or removed as a jet of material in the direction of interface closure and bond progression.

The wire 12 may be fed through the conduit 18 using a known wire feeder device. The wire feed and electromagnetic pulse repetition rates of the present invention correspond to the wire feed and reciprocation rates (i.e. metal transfers), respectively, of a conventional welding process.

For example, in reciprocating cold metal transfer welding, wire is fed at a rate of approximately 2 to 8 m/min and a reciprocation rate may be approximately 20 to 200 times per second. Corresponding rates may be used for wire feeding and magnetically actuated projection in accordance with the present invention so as to provide a continuous succession of segments 40 for forming layers of core material 46, 48.

The magnetic pulse welding arrangement 10 shown in FIGS. 2 and 3A 2B may also be used in conjunction with a railgun arrangement 60 (see FIGS. 4 and 53A 3B) to propel the segment 40 toward the substrate 34. A railgun section 58 includes first 62 and second 64 spaced apart electrically conductive rails for receiving the segment 40. The first 62 and second 64 conductive rails are positioned downstream from a sheath end 66 to form the opening 20. The wire 12 is fed into the first conduit section 24 in the first direction 28 and toward the substrate 34. The wire 12 is fed past the opening 20 until a desired length of wire 12 is positioned in the railgun section 58. The coil 36 is energized so as to generate an electromagnetic pulse that interacts with the sheath 16 so that a portion of the wire 12 in the railgun section 58 is cut or pinched off the wire 12 to form the segment 40.

Referring to FIG. 53B, a pulse of high direct current 68 is conducted through the first rail 62, segment 40 and second rail 64. A Lorentz force then acts to propel the segment 40 toward the substrate 34 in accordance with a known railgun effect wherein the segment 40 serves as a railgun armature. The segment 40 is propelled toward the substrate 34 at a desired speed for forming an impact weld as previously described. Thus, the railgun arrangement 60 supplements the magnetic pulse welding arrangement 10. This enables the use of lower activation energies for generating the electromagnetic pulse.

Referring to FIGS. 6 and 7, an alternate embodiment of the invention is shown. In this embodiment, a laser impact welding arrangement 70 is used that employs aspects of a known laser impact welding technique. The laser impact welding arrangement 70 includes at least one laser device 72 that generates a pulse of laser energy 74. The laser device 72 is circumferentially positioned relative to the opening 20 and is oriented such that a portion of the laser energy pulse 74 is directed downstream to assist in propelling the segment 40. Note again that the opening 20 need not be a physical opening. In this embodiment, opening 20 only needs to be a location in conduit 18 that is transparent to light from the laser device 72 and such that the light energy may pass through conduit 18 to wire 12. Carbon dioxide laser light for example transmits through materials such as certain salt windows. Diode and YAG laser light for example transits through materials such as glass.

In operation, the laser device 72 is energized so as to generate a laser energy pulse that impinges on the sheath 16 to cause spaced apart portions of the sheath 16 to move toward each other until the sheath 16 is ruptured so that a portion of the wire 12 in the second conduit section 26 is cut or pinched off the wire 12 to form the segment 40. The surface of the sheath 16 ablates due to the laser energy pulse 74 to cause the generation of a gas 76 that produces a gas pressure that propels the segment 40 toward the substrate 34. The sheath 16 may also include an ablative material in order to enhance the formation of the gas 76 and further increase acceleration of the segment 40. Further, an optically transparent material 78 may be placed opposite the ablated surface 16 to provide a surface that opposes the generation of expanding gas 76 to also increase acceleration of the segment 40. It is noted that the sheath 16 in this embodiment does not need to be conductive.

The segment 40 impacts the substrate 34 at a sufficiently high velocity to form an impact weld that joins the powder core material 14 and sheath 16 and the substrate 34 thereby forming a first layer of core material 46 as previously described. Additional segments 40 are then continuously pinched off from the wire 12, each propelled toward a previously formed layer of core material, i.e., an underlying layer, so as to incrementally form additional layers of core material as previously described. In particular, suitable rates may be used for wire feeding and laser energy pulse generation so as to provide a continuous succession of segments 40 for forming layers of core material.

Figure 8:
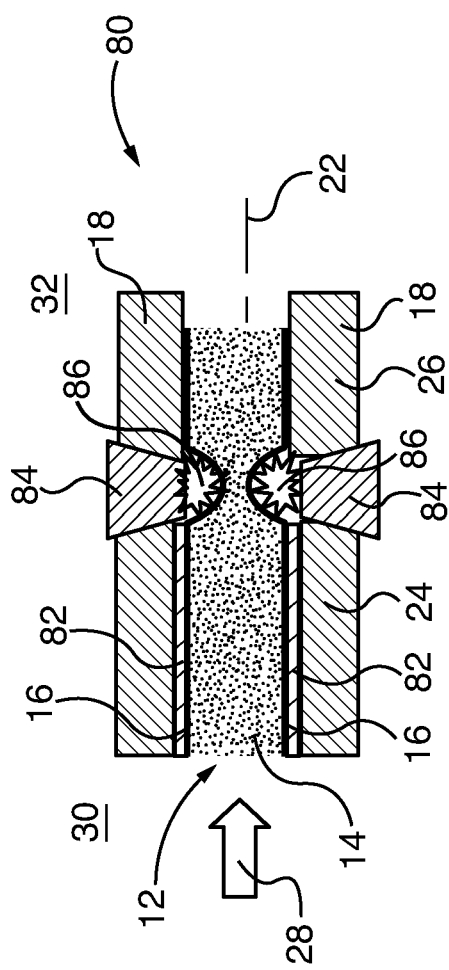
FIGS. 8 and 9 depict another embodiment of the invention wherein a vaporized foil actuator welding arrangement is used to form a wire segment that is accelerated toward a substrate to form an impact weld.
Figure 9:
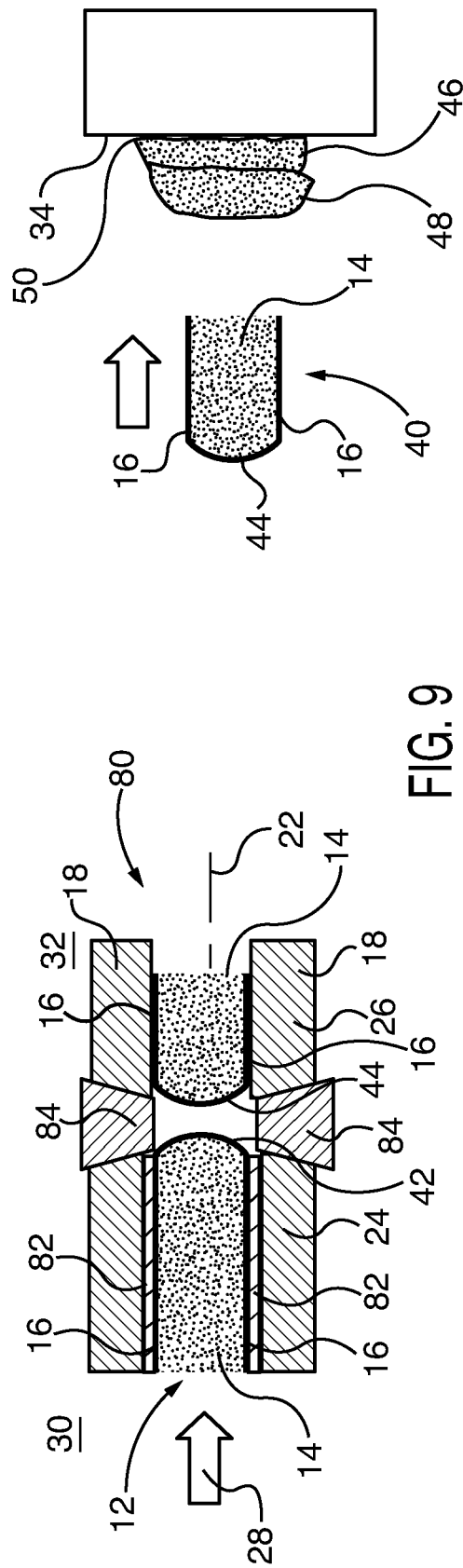

Referring to FIGS. 8 and 9, another embodiment of the invention is shown. In this embodiment, a vaporized foil actuator welding arrangement 80 is used that employs aspects of a known vaporized foil actuator welding technique. In this embodiment, a consumable material 82 is formed on the sheath 16 that vaporizes rapidly when subjected to a pulse of a high electric current. For example, the consumable material may be a metal foil layer 82 such as aluminum foil that is formed on the sheath 16. The vaporized foil actuator welding arrangement 80 includes at least one electrode 84 that generates a pulse of high electric current. The electrode 84 is circumferentially positioned relative to the opening 20 and is in contact with the foil layer 82.

In operation, the electrode 84 is energized so as to generate a pulse of a high electric current that is discharged into the foil layer 82. This causes rapid vaporization of the foil layer 82 and generates gas pressure 86 that causes spaced apart portions of the sheath 16 to move toward each other until the sheath 16 is ruptured so that a portion of the wire 12 in the second conduit section 26 is pinched off the wire 12 to form the segment 40. The gas pressure 86 also propels the segment 40 toward the substrate 34. The segment 40 impacts the substrate 34 at a sufficiently high velocity to form an impact weld that joins the powder core material 14 and the substrate 34 thereby forming a first layer of core material 46 as previously described. Additional segments 40 are then consecutively pinched off from the wire 12, each propelled toward a previously formed layer of core material, i.e., an underlying layer, so as to incrementally form additional layers of core material as previously described. In particular, suitable rates may be used for wire feeding and high electric current generation so as to provide a continuous succession of segments 40 for forming layers of core material. The foil layer 82 could be continuous on the wire 12 or could be intermittent and synchronized to the segments 40 of wire 12 to be propelled for solid state non-interrupted deposition on the substrate 34.

Powder actuated welding has been commonly used by building contractors to attach steel pins to steel substrates, for example, for the purpose of securing wooden decking over steel I-beams using the pins as anchors. The procedure is often conducted using a 'Hilty gun'. Hilty is the name of a popular manufacturer of the tool used for such purpose. Detonation of a charge, such as used in a 22 caliber pistol, accelerates and drives the pins against the substrate to weld their ends by impact and solid state bonding. With a powder actuated tool, such as a Hilty gun, the discharge is created by ignition of a chemical propellant charge to create a controlled explosion that enables the projectile to be discharged at a high velocity. Alternately, a compressed gas released suddenly may also be utilized to discharge the projectile. The projectile in the case of a nail gun would be nails or steel pins, however, shot material may be utilized for solid state bonding. Repetitive and highly directed application of such a 'nail gun' with shot material is inventively proposed to achieve a high deposition rate solid state additive manufacturing.

Figure 10:
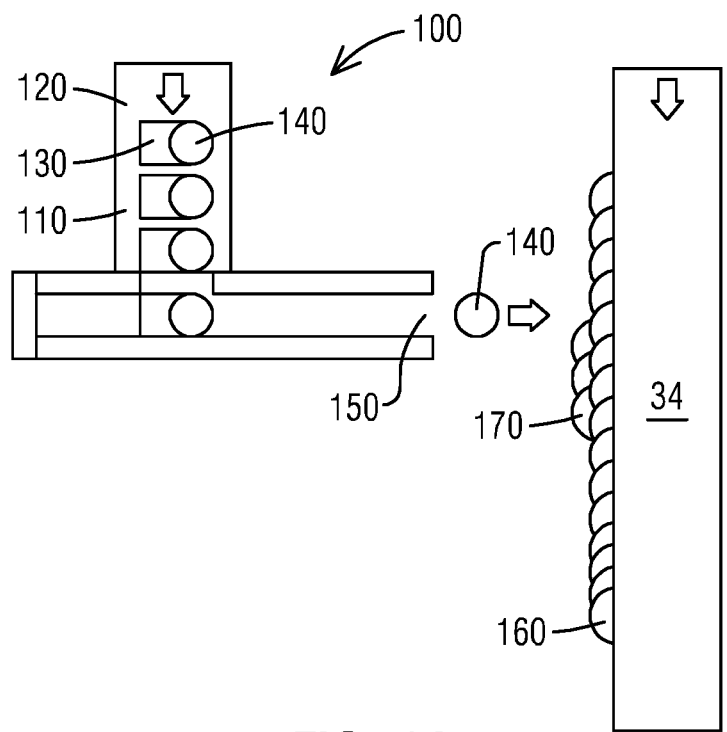
FIGS. 10 and 11 depict an embodiment wherein a discharge actuated welding arrangement is used to accelerate a metallic shot propellant toward a substrate to form an impact weld.
Figure 11:
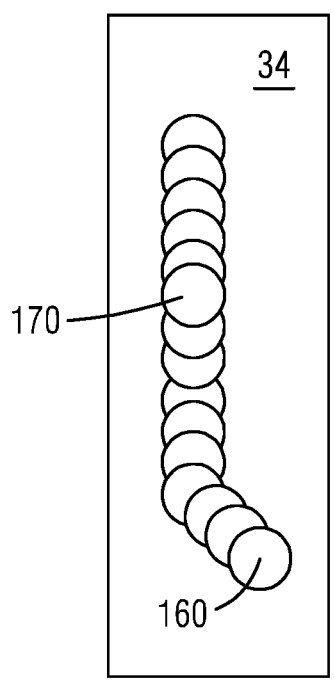

Referring now to FIGS. 10 and 11, a discharge actuated welding arrangement 100 for use in an additive manufacturing process is shown in FIG. 10. The discharge actuated welding arrangement 100 includes a discharge actuated device 110. A Hilty gun has been described previously in this disclosure and may be utilized as the discharge actuated device but other discharge actuated devices may also be used. The magazine 120 of the discharge actuated device 110 may be loaded with a charge 130 and a projectile 140 as illustrated. The projectile 140 may be metallic shot material. In an embodiment, the metallic shot material 140 may be a nickel based superalloy material, such as that used for turbine components. The metallic shot material 140 may be in the range of 0.5 to 35 mm in diameter, and more particularly in the range of 1 to 4 mm in diameter.

Metallic shot material 140 may be discharged through an opening 150 in the discharge actuated device 110 so that the metallic shot material 140 is propelled towards the substrate 34 at a sufficient velocity to form an impact weld for welding the metallic shot material 140 to the substrate 34. A plurality of metallic shot material 140 may be used to form a layer 160 of core material. Each 'shot' forms a solid state bond to an adjacent 'shot' in the layer 160. In the illustrated embodiment, an underlying layer 160 has been formed. Further shots may be discharged incrementally to form an additional layer 170 on top of the underlaying layer 160. Each shot may be discharged from the opening 150 at a velocity of between 100 and 500 m/sec. The discharging may be accomplished manually by depressing a trigger or automatically by a robotic device. Automatic discharges may be as rapid as at least 20 times per second and in such case may require supplemental cooling of the barrel of the device.

In order to create a layer of additive material 160 on the substrate 34, the substrate 34 may be traversed in a direction, as illustrated by the arrow on the substrate in FIG. 10, relative to the discharge actuated device 110. Alternately, in an embodiment, the discharge actuated device 110 may be traversed relative to the substrate 34 in order to create the layer of additive material 160. Successive layers 170 may be built on top of the underlying layer 160 via the discharge actuated impact weld process in order to form a desired part or component. FIG. 11 depicts a top view of the two deposited layers 160, 170 shown in FIG. 10.

Thus, the disclosure provides impact welding processes that avoid solidification cracking and reduces residual stresses and strain age cracking for components such as superalloy blades, vanes and similar articles used on gas and steam turbines which are highly stressed and operate at elevated temperatures. Disclosed embodiments may be more controllable and amenable to continuous processing. Additionally, the described processes may be done from any position, i.e., the substrate does not need to lay flat as is needed for selective laser melting and selective layer sintering processes.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method for forming an impact weld used in an additive manufacturing process, comprising:
providing a metallic material for impact welding to a substrate;
propelling the metallic material toward the substrate with a discharge velocity to form an impact weld for welding the metallic material to the substrate;
traversing the substrate 34 in a direction relative to a direction from which the metallic material is propelled and repeating the propelling so that a lyaer of additive material is deposited on the substrate 34 as desired,
providing a wire having a powder filler metal core located within a sheath;
inserting the wire within a conduit 18 having an opening; and
providing at least one laser energy pulse through the opening 20,
wherein the laser energy pulse interacts with the sheath 16 to ablate the sheath 16 and pinch off at least one segment of the wire, wherein the ablation generates gas pressure propelling the segment toward a substrate with the discharge velocity to form an impact weld for welding the metal core and sheath to the substrate.

2. The method as claimed in claim 1, wherein the opening exposes a circumferential portion of the sheath.

3. The method as claimed in claim 1, wherein a plurality of segments are continuously deposited on the substrate to form a plurality of layers on the substrate.

4. The method as claimed in claim 2 further comprising:
providing a wire having a powder filler metal core located within a sheath having a consumable foil;
inserting the wire within a conduit having an opening;
providing at least one pulse of high electric current to the foil, wherein the current pulse vaporizes the foil to pinch off at least one segment of the wire and wherein vaporization of the foil generates gas pressure that propels the segment toward a substrate with the discharge velocity to form an impact weld for welding the metal core and sheath to the substrate.

5. The method as claimed in claim 4, wherein the opening exposes a circumferential portion of the sheath.

6. The method as claimed in claim 4, wherein a plurality of segments are continuously deposited on the substrate to form a plurality of layers on the substrate.

7. A method for forming an impact weld used in an additive manufacturing process via a discharge actuated arrangement, comprising:
providing a discharge actuated device having an opening;
loading a metallic shot material into a magazine of the discharge actuated device;
discharging the metallic shot particle from the device through the opening wherein the discharged metallic particle is propelled toward a substrate with a discharge velocity to form an impact weld for welding the metallic shot particle to the substrate,
traversing the substrate in a direction relative to the discharge actuated device and repeating the propelling so that a layer of additive material is deposited on the substrate and/or underlaying layer respectively as desired.

8. The method as claimed in claim 7, further comprising loading a charge into the magazine, wherein the discharging is created by a chemical reaction of the charge.

9. The method as claimed in claim 7, wherein the discharging is created by a quick release of a compressed gas.

10. The method as claimed in claim 7, wherein the discharging includes discharging the metallic particle from the opening 150 at the discharge velocity of 100 to 500 m/sec.

11. The method as claimed in claim 7, wherein the discharging includes automatically activating a discharge at least times per second, wherein each discharge comprises a single metallic shot 140.

12. The method as claimed in claim 7, wherein the metallic shot material is a nickel-based superalloy material.

13. The method as claimed in claim 7, wherein the metallic shot material includes a diameter in the range of 0.5 to 35 mm.

14. The method as claimed in claim 13, wherein the metallic shot material includes a diameter in the range of 1 to 4 mm.

15. The method as claimed in claim 7, further comprising traversing the discharge actuated device in a direction relative to the substrate and repeating the propelling so that a layer of additive material is deposited on the substrate and/or underlying layer respectively as desired.

16. The method as claimed in claim 7, wherein a successive layer is built on top of the deposited layer of additive material.

17. The method as claimed in claim 15, wherein a successive layer is built on top of the deposited layer of additive material.

* * * * *